May 29, 1928.  
W. O. LYTLE  
1,671,772  
GLASS INSPECTION APPARATUS  
Filed May 20, 1925   2 Sheets-Sheet 2
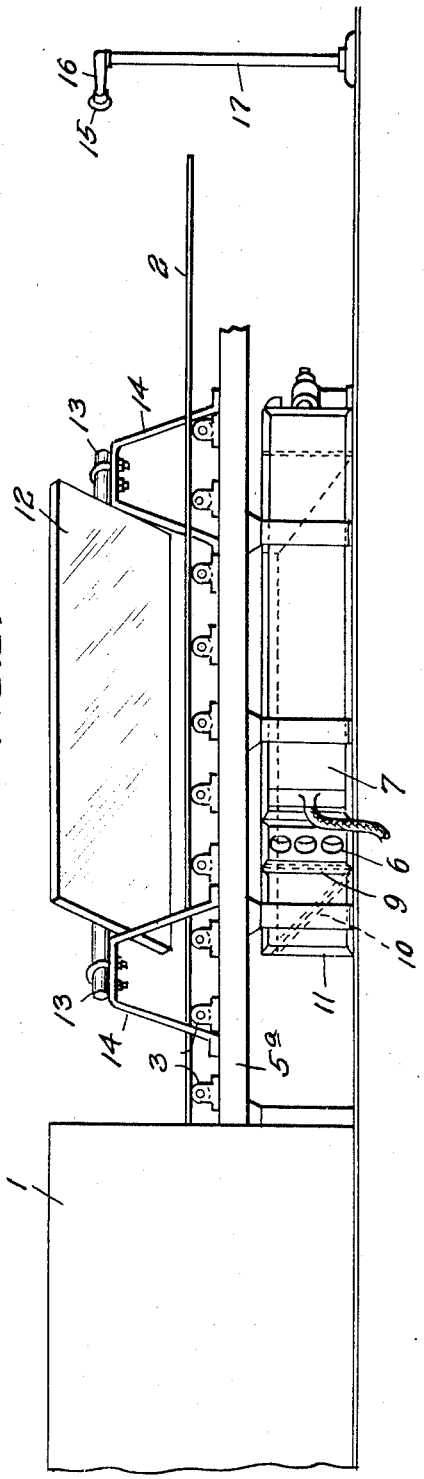
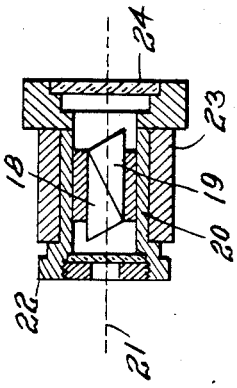
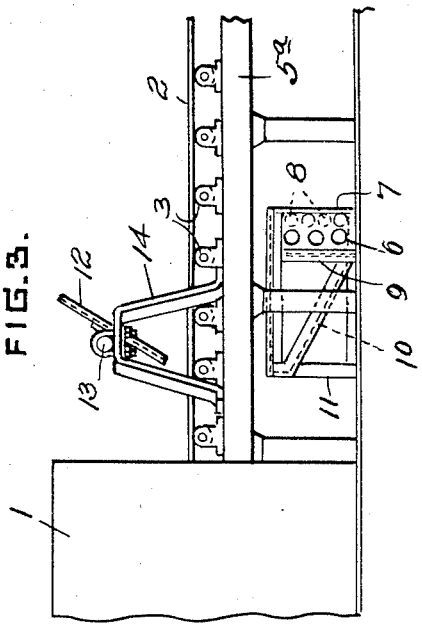
INVENTOR  
W. O. Lytle  
by  
James C. Bradley  
atty Patented May 29, 1928.

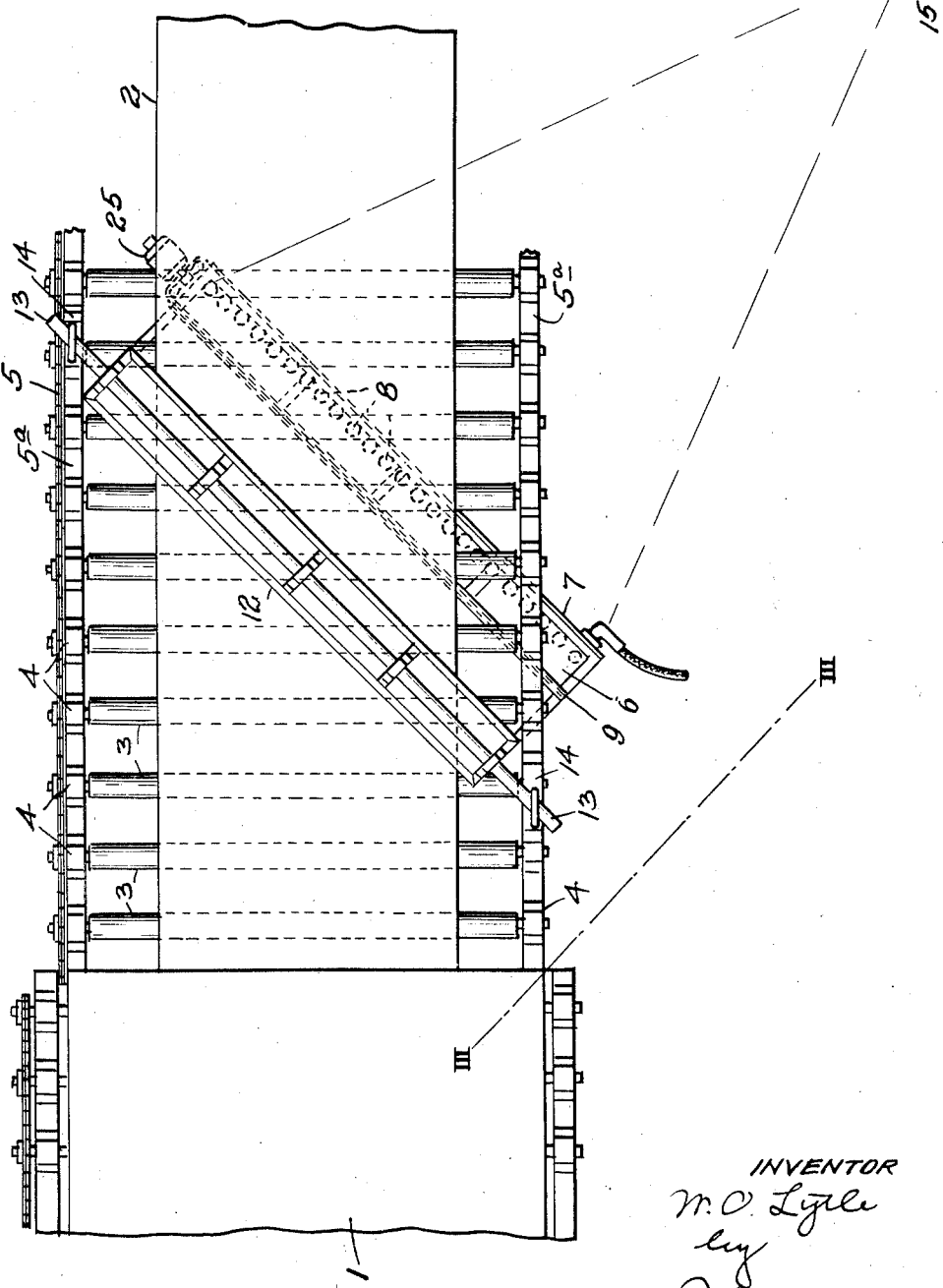

1,671,772

UNITED STATES PATENT OFFICE.

WILLIAM O. LYTLE, OF NEW KENSINGTON, PENNSYLVANIA, ASSIGNOR TO PITTSBURGH PLATE GLASS COMPANY, A CORPORATION OF PENNSYLVANIA.

GLASS-INSPECTION APPARATUS.

Application filed May 20, 1925. Serial No. 31,728.

The invention relates to inspection apparatus for use in determining the degree and location of strain in sheet glass after the annealing operation, so that annealing conditions may be adjusted or corrected with such determination as a basis. It has for its objects the provision of an improved apparatus whereby the glass may be inspected as it comes from the leer upon its carrier or runway without any additional handling or manipulation of such glass. It is particularly designed for use in connection with a continuously formed sheet or ribbon of glass, and is so illustrated, but is applicable to plate glass produced in the ordinary way and carried past the inspecting device in separate sheets instead of in a continuous ribbon. Certain embodiments of the invention are illustrated in the accompanying drawings, wherein:

Figure 1 is a plan view of the apparatus. Fig. 2 is a side elevation. Fig. 3 is an elevation looking at right angles to the line III—III. And Fig. 4 is an enlarged section through the analyzer.

Referring to the drawings, 1 is the outlet end of a roller leer through which the continuous sheet or ribbon of glass 2 is conducted from a melting tank having suitable sheet generating means. After emerging from the leer, the glass is supported upon the spaced supports, preferably in the form of the rollers 3, 3, 3, etc., the ends of the rollers being journaled in bearings 4, 4, 4 etc. carried by the framework 5ª. The rolls together constitute the bed of a carrier or runway, such rollers being preferably driven by means of a sprocket chain 5 passing over suitable sprockets at the ends of the rolls.

Extending transversely and beneath the runway in an oblique direction, is a light chamber 6 preferably made of sheet metal with one vertical end wall 7 acting as a support for a large number of incandescent lights 8, and with the opposing vertical wall 9 of frosted glass, which serves to diffuse the light from the lights 8. Extending along the light chamber in opposition to the frosted plate 9 is an inclined polarizing reflector 10. This reflector is supported in a suitable framework 11 and preferably consists of a slab of black glass. This glass is practically opaque and has a polished surface, so that it forms a good reflector. It is placed at such an angle that the light from the light box is polarized, the polarized rays being reflected vertically upward.

The vertically reflected polarized rays pass through the glass sheet 2, and are received upon a second reflector 12 which also extends across the bed of the runway, so that its longitudinal edges are parallel to the edges of the reflector 10. This mirror is mounted upon trunnions 13, 13 carried by the brackets 14, 14 so that the mirror may be adjusted at any desired angle, preferably at about 45 degrees to the vertical. This reflector may be a plate glass mirror of the ordinary type. The light received upon this mirror from below is reflected substantially horizontally, and an anlysis of these light rays which have passed through the sheet of glass 2 serve to indicate the condition of strain throughout the width of the sheet, thus serving to indicate the character of the annealing performance of the leer.

Mounted at one side of the leer a considerable distance in front of the mirror 12 is the analyzer 15, such analyzer being mounted upon a swinging arm 16 carried by the post 17. The analyzer is of the ordinary type, as indicated in Fig. 4, carrying a Nicol prism (parts 18 and 19), supported in the rotatable sleeve 20, so that the prism may be adjusted around the axis 21. The sleeve 20 carries the eye piece 22, while the fixed casing 23 carries a mica quarter wave or selenite plate 24, which, although not necessary, may be used to advantage, the construction of this analyzer being well known in the art. As the light box 6 tends to become overheated, due to the large number of lights employed, this chamber is preferably formed with open ends as indicated in Fig. 1 and an electric fan 25 is provided at one end to supply a cooling flow of air longitudinally of the box.

The colors as observed through the analyzer at different points across the width of the sheet indicate the condition of the glass with respect to stain and any variation in these conditions is readily observed through the analyzer. For instance, in the case of a well annealed sheet, using a red-green selenite plate, the main body of the sheet from a point a few inches inside of each edge shows a uniform straw color, while the edges of the sheet show a light green color, thus indicating that there is some strain in the edges of the sheet. The use of the device serves to give a check upon the performance of the leer and the heat conditions in the leer so that proper adjustments may be made in the heating apparatus in case a departure is noted in the strain conditions as registered in the polarizing device. The annealing function of the leer is also dependent upon the speed of movement of the glass through the leer and the polarizing device thus becomes useful when the normal conditions in the operation of the leer are disturbed or changed by reasons of a variation in the speed of producing or generating the continuous sheet.

What I claim is:

1. The combination with a carrier or runway for sheet glass having a bed comprising spaced supports for the glass, of an inspection device comprising a source of illumination on one side of the bed, an inclined polarizing reflector in position to receive the light from said source of illumination and reflect the polarizing portion thereof between said spaced supports and through the glass carried thereby, a second inclined reflector extending across the runway above the glass on the other side of said bed in position to receive the polarized light transmitted through the glass from the first reflector and to transmit it laterally, and an analyzer located at one side of the runway in position to receive the light reflected form the second reflector.

2. The combination with a carrier or runway for sheet glass having a bed comprising spaced supports for the glass, of an inspection device comprising a source of illumination on one side of the bed, extending obliquely thereacross, an inclined polarizing reflector on the same side of the bed as said source of illumination also extending obliquely across the bed in opposition to the source of illumination in position to receive the light from the source of illumination and reflect the polarized portion thereof between said spaced supports and through the glass carried thereby, a second inclined reflector extending obliquely across the table on the other side of said bed in opposition to the polarizing reflector in position to receive the light from the polarizing reflector and reflect it laterally, and an analyzer in position to receive the light reflected from said second reflector.

3. The combination with a carrier or runway for sheet glass having a bed comprising spaced rollers and means for supplying a continuously formed sheet of glass over said bed, of an inspection device comprising a source of illumination beneath the bed extending obliquely therebeneath, an inclined polarizing reflector also extending obliquely across the bed in opposition to the source of illumination in position to receive the light from the source of illumination and reflect the polarized portion thereof upward between said spaced rollers and through the glass carried thereby, a second inclined reflector extending obliquely across the table above the glass in opposition to the polarizing reflector in position to receive the light from the polarizing reflector and reflect it laterally, and an analyzer in position to receive the light reflected from said second reflector.

In testimony whereof, I have hereunto subscribed my name this 6th day of May, 1925.

WILLIAM O. LYTLE.